United States Patent

Inoue et al.

[11] Patent Number: 5,984,516
[45] Date of Patent: Nov. 16, 1999

[54] ENCLOSED KNEADING APPARATUS

[75] Inventors: Kimio Inoue; Kashiro Ureshino; Norifumi Yamada; Ko Takakura; Yoshinori Kurokawa, all of Takasago, Japan

[73] Assignee: Kabushiki Kaisha Kobe Seiko Sho, Kobe, Japan

[21] Appl. No.: 08/989,322

[22] Filed: Dec. 11, 1997

[30] Foreign Application Priority Data

| Dec. 19, 1996 | [JP] | Japan | 8-339901 |
| Apr. 24, 1997 | [JP] | Japan | 9-106880 |
| Jun. 2, 1997 | [JP] | Japan | 9-142871 |
| Jul. 16, 1997 | [JP] | Japan | 9-190891 |

[51] Int. Cl.$^6$ ............................................. B29C 47/62
[52] U.S. Cl. ........................... 366/85; 366/297; 366/300; 425/204; 425/208
[58] Field of Search ................................ 425/204, 207, 425/258; 366/84, 85, 297, 300

[56] References Cited

U.S. PATENT DOCUMENTS

| 3,423,074 | 1/1969 | Loomans | 425/204 |
| 4,058,297 | 11/1977 | Seufert | 366/81 |
| 4,234,259 | 11/1980 | Wiedmann et al. | 366/81 |
| 4,718,771 | 1/1988 | Asai et al. | 366/97 |
| 4,824,256 | 4/1989 | Häring et al. | 366/85 |
| 4,834,543 | 5/1989 | Nortey | 366/297 |
| 4,871,259 | 10/1989 | Harada et al. | 425/209 |
| 4,893,936 | 1/1990 | Borzenski et al. | 366/300 |
| 4,914,635 | 4/1990 | Nishigai et al. | 366/97 |
| 5,590,959 | 1/1997 | Ueda et al. | 366/84 |
| 5,672,005 | 9/1997 | Fukui et al. | 366/75 |

FOREIGN PATENT DOCUMENTS

| 48347/79 | 1/1980 | Australia . |
| 30282/89 | 10/1989 | Australia . |
| 882769 | 11/1981 | U.S.S.R. . |
| 1109317 | 8/1984 | U.S.S.R. . |
| 748197 | 4/1956 | United Kingdom . |
| 2 124 508 | 2/1984 | United Kingdom . |

*Primary Examiner*—Harold Pyon
*Assistant Examiner*—Joseph Leyson
*Attorney, Agent, or Firm*—Oblon, Spivak, McClelland, Maier & Neustadt, P.C.

[57] ABSTRACT

An enclosed kneading apparatus which can smoothly knead and disperse kneaded products of various kneading conditions without the maintenance of a rotor moving mechanism for a first and second rotors and the operation which sacrifices the handling capacity of the kneading apparatus and at the same time, prevent an excessive increase in the temperature of the kneaded products. In the apparatus, the kneaded product of a desired kneading state is obtained by flowing a kneading object in tip clearances between the inner wall of a chamber and a first and second rotors while rotating the first and second rotors in the chamber, and by imparting a shearing force to disperse the kneading object. The respective first and second rotors are provided with three long wings in helical fashion each having a plurality of tip portions for providing a plurality of three tip clearances in the axial direction.

9 Claims, 13 Drawing Sheets

ROTER SPEED N = 90 rpm

ENCLOSED KNEADING APPARATUS

BACKGROUND OF THE INVENTION

1. Field of the Invention

The present invention relates to an enclosed kneading apparatus for kneading materials such as rubber, plastic and so forth by rotating rotors in a chamber.

2. Description of the Related Art

Batch-type enclosed kneading apparatuses manufacture a batch of kneaded products by a series of operations such that kneading materials such as rubber, plastic and so forth are pressed into a chamber by a floating weight, the materials are kneaded by a pair of rotors provided in the chamber to obtain a kneaded product of a desired state, and the kneaded product is discharged from the chamber through a drop door.

The above kneading is performed by allowing a rotation force of the rotors to act as a shearing force on the kneaded product. It has been known that the shearing force is maximum in a clearance between the rotors and the inner wall of the chamber (hereinafter, referred to as tip clearance), and the maximum shearing force increases with the decrease of the tip clearance. Therefore, it is apparent that decreasing the tip clearance accelerates the kneading due to the dispersive action caused by a large shearing force. However, if the tip clearance decreases, a large shearing force is locally imparted to the kneaded product, so that the temperature of the kneaded product increases.

Thus, in the case of manufacturing a kneaded product having a low allowable temperature, steps are taken such that the tip clearance is set to increase, the rotor speed is decreased although productivity decreases, and the input amount of materials is reduced in order to prevent an increase in the temperature over the allowable temperature even if kneading efficiency is low. In addition, in the case of manufacturing a kneaded product having a high allowable temperature, the tip clearance is sufficiently decreased and the rotor speed is increased in order to obtain a large shearing force while attaching importance to kneading efficiency.

According to the above conventional arrangements, however, the tip clearance is suitable only for a specific kneading condition. Thus, unless the rotors are replaced so as to provide a tip clearance responsive to the kneading condition when the type of the kneaded product is switched to change the kneading condition, an excessive tip clearance or a too small tip clearance is provided which exacerbates the problems of insufficient kneading and dispersion, and the increase in temperature of the kneaded product over the allowable temperature. However, it is impractical to replace the rotors in response to the kneading condition. When the temperature of the kneaded product increases over the allowable temperature, the quality of the kneaded product is actually ensured at the sacrifice of the handling capacity of the kneading apparatus, i.e., by decreasing the speed of rotors and reducing the input amount of materials.

When merely increasing the cooling efficiency, an enclosed kneading apparatus as disclosed in Japanese Unexamined Patent Publication No. 63-47106 may be used in which two helical long wings extending in the axial direction are provided in the circumferential direction, scrapers are disposed at the back of the long wings, and a kneaded product layer attached to the inner surface of a chamber is scraped off by the scrapers, whereby the cooling efficiency through the chamber is increased. In the above enclosed kneading apparatus, however, only the long wings provide a specific tip clearance and perform a shearing function, and the technical idea of imparting the shearing function to the scrapers is not described, so that the apparatus is insufficient in the sense of a change of the tip clearance.

In addition, an enclosed kneading apparatus has been developed in which rotation axes of rotors can move so that the tip clearance can be arbitrarily changed in response to the kneading condition rather than impractical replacement of the rotors. In this case, however, checking and maintenance of a mechanism for moving the rotation axes of the rotors are required each time the axes are moved, the setup time increases, and the checking operation becomes complicated.

SUMMARY OF THE INVENTION

Accordingly, it is an object of the present invention to provide an enclosed kneading apparatus which can smoothly knead and disperse kneaded products of various kneading conditions without requiring checking and maintenance operations and with no sacrifice in the inherent handling capacity of the kneading apparatus and at the same time, prevent an excessive increase in the temperature of the kneaded product.

In order to achieve the above object, in a first aspect of the present invention, there is provided an enclosed kneading apparatus comprising a chamber and a rotor provided with wings for providing a plurality of different tip clearances between the inner wall of the chamber and the rotor at least in the axial direction, so that a kneaded product of a desired kneading state is obtained by flowing a kneading object in the tip clearances while rotating the rotor in the chamber, and by imparting a shearing force to disperse the kneading object.

In a second aspect of the present invention, there is provided an enclosed kneading apparatus according to the first aspect, wherein the wings consist of long wings and short wings, and a plurality of different tip clearances are provided at least along the long wings.

In a third aspect of the present invention, there is provided an enclosed kneading apparatus according to the second aspect, wherein at least two of the long wings and short wings are provided in the circumferential direction of said rotors, and a plurality of different tip clearances are provided at the at least two of the long wings and short wings.

In a fourth aspect of the present invention, there is provided an enclosed kneading apparatus according to the first aspect, wherein one of the plurality of tip clearances are provided by allowing the tops of the wings to be in close proximity to the inner wall of the chamber so as to scrape off the surface of the kneading object attached to the inner wall of the chamber and impart a strong shearing force to a part of the kneading object.

In a fifth aspect of the present invention, there is provided an enclosed kneading apparatus according to the first aspect, wherein the plurality of tip clearances include at least two tip clearances of a small tip clearance, a medium tip clearance, and a large tip clearance, and the ratio of the tip clearance to the inner diameter of the chamber is within the range of 0.0025 to 0.0250 at the small tip clearance, within the range of 0.0100 to 0.0500 at the medium tip clearance, and within the range of 0.0250 to 0.1000 at the large tip clearance.

In a sixth aspect of the present invention, there is provided an enclosed kneading apparatus according to the fifth aspect, wherein the ratio of the tip clearance to the inner diameter of the chamber is within the range of 0.00625 to 0.0125 at the small tip clearance, within the range of 0.0125 to 0.0250 at the medium tip clearance, and within the range of 0.0250 to 0.075 at the large tip clearance.

In a seventh aspect of the present invention, there is provided an enclosed kneading apparatus according to the first or the fourth aspect, wherein the wings include one wing having a plurality of stepwise tip clearances formed thereon.

In an eighth aspect of the present invention, there is provided an enclosed kneading apparatus according to the seventh aspect, wherein at least one tip clearance of the plurality of stepwise tip clearances is tapered.

In a ninth aspect of the present invention, there is provided an enclosed kneading apparatus according to the first or the fourth aspect, wherein the wings include one wing having a plurality of tapered tip clearances formed thereon.

In a tenth aspect of the present invention, there is provided an enclosed kneading apparatus according to the first or the fourth aspect, wherein the wings of the rotors are constituted by divided segments.

BRIEF DESCRIPTION OF THE DRAWINGS

FIGS. 4A and 4B are illustrations each showing a flowing state of the kneading object, in which FIG. 4A shows the flow state in the enclosed kneading apparatus according to the present invention, and FIG. 4B shows the flow state in a conventional enclosed kneading apparatus;

FIGS. 5A and 5B are illustrations each showing states of long wings and short wings of a rotor, in which FIG. 5A is a development of the rotor, and FIG. 5B is an axial cross-sectional view of the rotor;

DESCRIPTION OF THE PREFERRED EMBODIMENT

The preferred embodiment of the present invention will now be described with reference to FIGS. 1 to 10.

Figure 3:
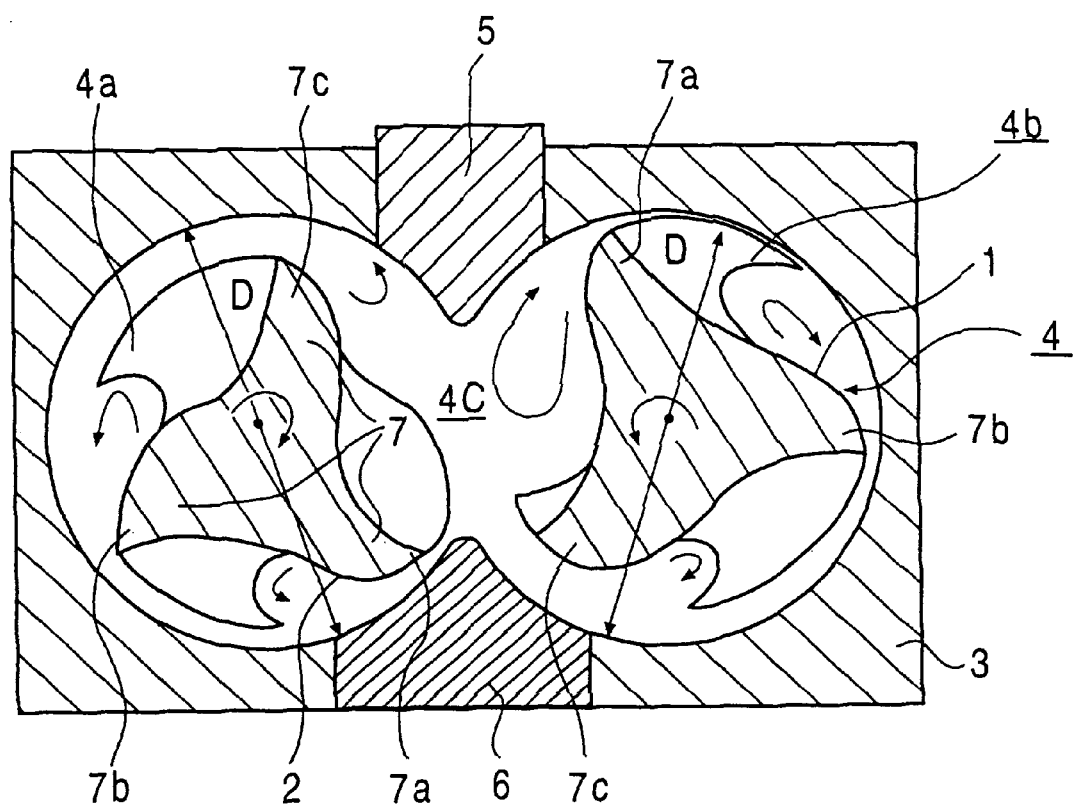
FIG. 3 is an illustration showing a state in which a kneading object is kneaded.

An enclosed kneading apparatus according to the present invention includes a pair of first rotor 1 and second rotor 2, and a case 3 for rotatably supporting these rotors 1 and 2. A cooling pipe (not shown) is connected to the outer wall of the case 3 so as to cool a kneaded product. A chamber 4 for accommodating the kneaded product is formed inside the case 3. The chamber 4 is formed to have a vertical cross section having the shape of two overlapping circles, as shown in FIG. 3, and consists of a pair of first kneading chamber 4a and second kneading chamber 4b each having an inner diameter D, and a communication section 4c for communicating between these kneading chambers 4a and 4b.

A floating weight 5 for pressing kneading materials such as rubber, plastic and so forth into the chamber 4 is provided at the upper center of the case 3 so as to move up and down. On the other hand, a drop door 6 for discharging a kneaded product is provided at the lower center of the chamber 4. The arrangement is such that the floating weight 5 and the drop door 6 are closely brought into contact with the case 3 during kneading to form a part of the inner wall of the chamber 4.

Figure 1:
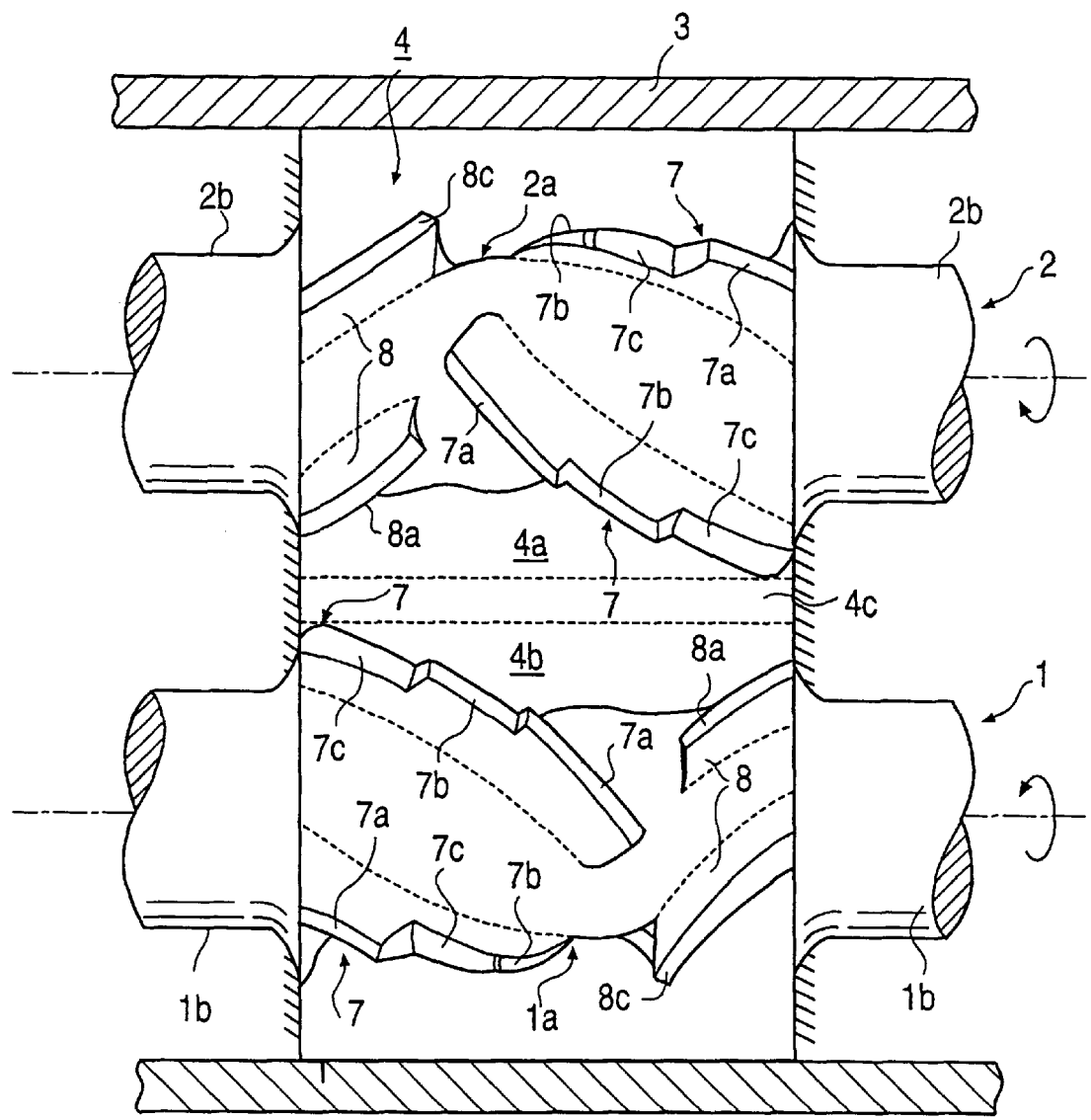
FIG. 1 is a front view of rotors in an enclosed kneading apparatus according to the present invention.

The first and the second rotor 1 and 2 are inserted through the first and the second kneading chambers 4a and 4b, respectively, as shown in FIG. 1. These rotors 1 and 2 are disposed so that their axes are parallel to each other, and they are rotated by a drive mechanism (not shown) in directions opposite to each other. In addition, these rotors 1 and 2 are formed into the same shape having long wings 7 and short wings 8, as will be described later.

Figure 2:
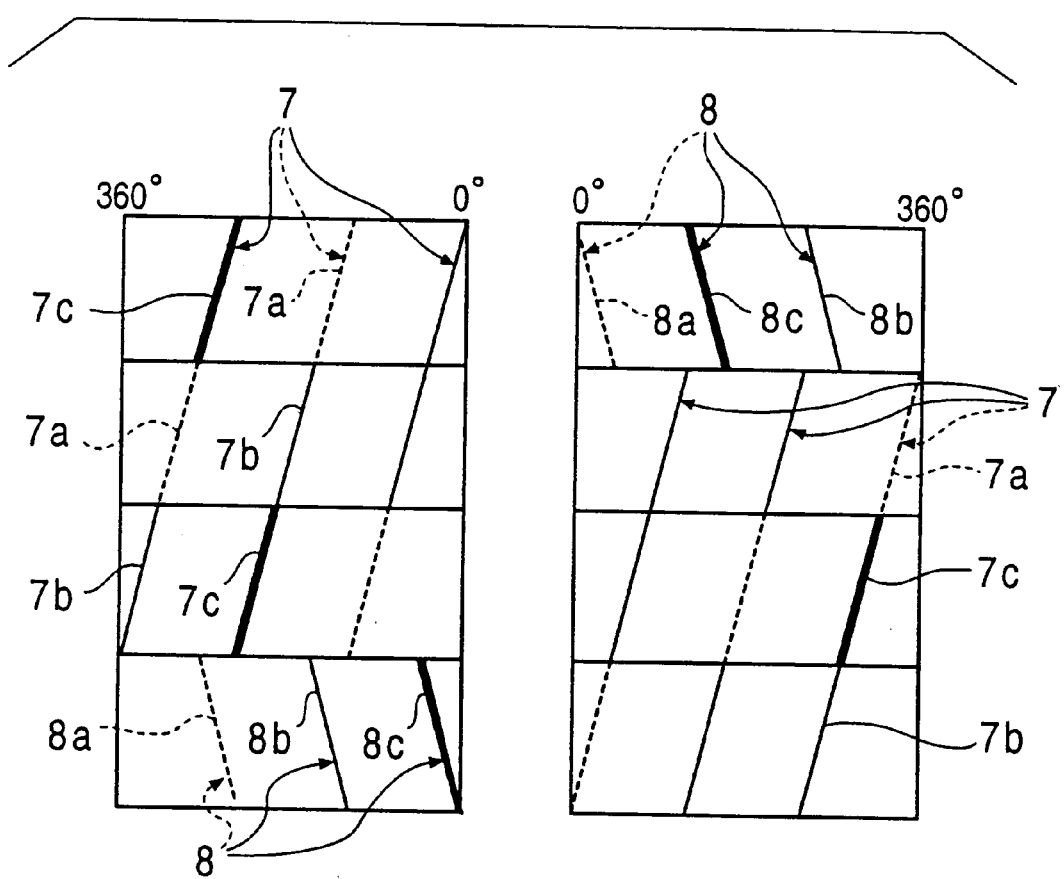
FIG. 2 is a development of the rotor.

The respective rotors 1 and 2 are formed at both rotor kneading portions 1a and 2a accommodated in the chamber 4, and have rotor support portions 1b, 1b and 2b, 2b which are rotatably supported by the case 3. The respective rotor kneading portions 1a and 2a have three long wings 7 and short wings 8 which are circumferentially equally disposed by 120° and axially extending, as also shown in FIG. 2. The respective long wings 7 are feed wings formed in helical fashion from one wall surface of the chamber toward the middle of the other wall surface. On the other hand, the respective short wings 8 are return wings formed in reverse helical fashion from between the end of the long wings 7 to the other wall surface of the chamber 4 so as to be located on the other side of the long wings 7.

A tip of each of the long wings 7 is divided into a high tip portion 7a, a medium tip portion 7b and a low tip portion 7c, and three tip portions having different heights appear in the axial direction. Further, the three tip portions having different heights also appear alternately in the circumferential direction of the long wings 7. The respective tip portions 7a, 7b and 7c are set to increase a tip clearance (clearance between the tip portion and the inner wall of the chamber 4) in the order of a small tip clearance, a medium tip clearance, and a large tip clearance.

That is, the arrangement is such that the high tip portions 7a are in close proximity to the inner wall of the chamber 4 so as to provide the smallest tip clearance so that, when the rotors 1 and 2 rotate, the high tip portions 7a impart a large shearing force to the kneaded product to increase kneading efficiency and dispersing efficiency, and scrape the surface of the kneaded product attached to the inner wall of the chamber 4 to increase cooling efficiency. Further, the high tip portions 7a allows most of the advancing kneaded product to flow in the axial direction to accelerate axial flowing of the kneaded product and at the same time, to accelerate flowing of the kneaded product between the first kneading chamber 4a and the second kneading chamber 4b.

On the other hand, the low tip portions 7c are sufficiently separated from the inner wall of the chamber 4 so as to provide the largest tip clearance. When the rotors 1 and 2 rotate, the low tip portions 7c increase the amount of the kneaded product passing through the tip clearance to accelerate flowing of the kneaded product in the kneading chambers 4a and 4b and at the same time, prevent a large shearing force from being imparted locally to the kneaded product to suppress an excessive increase in the temperature of the kneaded product.

The medium tip portions 7b are set to provide an intermediate tip clearance between the tip clearances of the high tip portions 7a and the low tip portions 7c so as to adjust the shearing force and flowing of the kneaded products of the high tip portions 7a and the low tip portions 7c.

The tip clearances may be set in any one of the following orders: medium, small, and large tip clearance; large, medium, and small tip clearance; and small, large, and medium tip clearance.

The respective short wings 8 provided on the other side of the long wings 7 are formed to have a high tip 8a, a medium tip 8b, and a low tip 8c, as shown in FIG. 2. The high tips 8a of the short wings 8 are in close proximity to the inner wall surface of the chamber 4 so as to provide the smallest tip clearance, similarly to the high tip portions 7a of the long wings 7 so that the high tips 8a impart a large shearing force to the kneaded product, scrape the surface of the kneaded product attached to the inner wall surface of the chamber 4, and accelerate flowing of the kneaded produce in the axial direction and between the kneading chambers 4a and 4b.

The low tips 8c are sufficiently separated from the inner wall of the chamber 4 so as to provide the largest tip clearance, similarly to the low tip portions 7c of the long wings 7 so that the low tips 4c increase the amount of the kneaded product passing through tip clearance, accelerate flowing of the kneaded product in the kneading chambers 4a and 4b, and prevent a large shearing force from being imparted locally to the kneaded product.

The medium tips 8b are set to provide an intermediate tip clearance between the tip clearances of the high tips 8a and the low tips 8c, similarly to the medium tip portions 7b of the long wings 7, so as to adjust the shearing force and flowing of the kneaded products of the high tips 8a and the low tips 8c.

A description will be given of the operation of the enclosed kneading apparatus of the present invention having the described construction. First, as shown in FIG. 3, the floating weight 5 is separated from the case 3 with the drop door 6 closely in contact with the case 3 to thereby open the top surface of the chamber 4. After charging kneading materials such as rubber, plastic, filling materials, and so forth into the chamber 4 from the opening, the floating weight 5 is brought into close contact with the case 3 and pressed into the communication section 4c of the chamber 4. In addition, almost simultaneously, cooling water or the like is flown into the cooling pipe connected to the outer wall of the case 3 so as to cool the kneading materials in the chamber 4 through the case 3. Depending on the configuration and type of the kneading materials, a heating medium such as hot water, vapor and so forth may be flown in the cooling pipe in order to heat the kneading materials.

Next, in order to obtain a kneaded product of a desired kneading state while shearing and dispersing the kneading materials, the first and second rotors 1 and 2 are rotated in the opposite directions to start kneading. Since the high tip portions 7a of the long wings 7 and the high tips 8a of the short wings 8 are set to provide a small clearance, if pieces of block-like rubber are charged as kneading materials into the communication section 4c, these materials are moved to the first and second kneading chambers 4a and 4b by a large shearing force, as shown in FIG. 3 when the first and second rotors 1 and 2 are rotated. Therefore, the kneading materials can be always dispersed into all the spaces in the chamber 4 in a short time after the start of kneading even if the kneading materials have a wide variety of shapes and sizes.

When the kneading materials are kneaded while being dispersed in the chamber 4 as described above, the respective tip portions 7a, 7b, and 7c of the long wings 7, and the respective tips 8a, 8b, and 8c of the short wings 8 act on a kneading object consisting of kneading materials and kneaded products as follows.

Figure 4A:
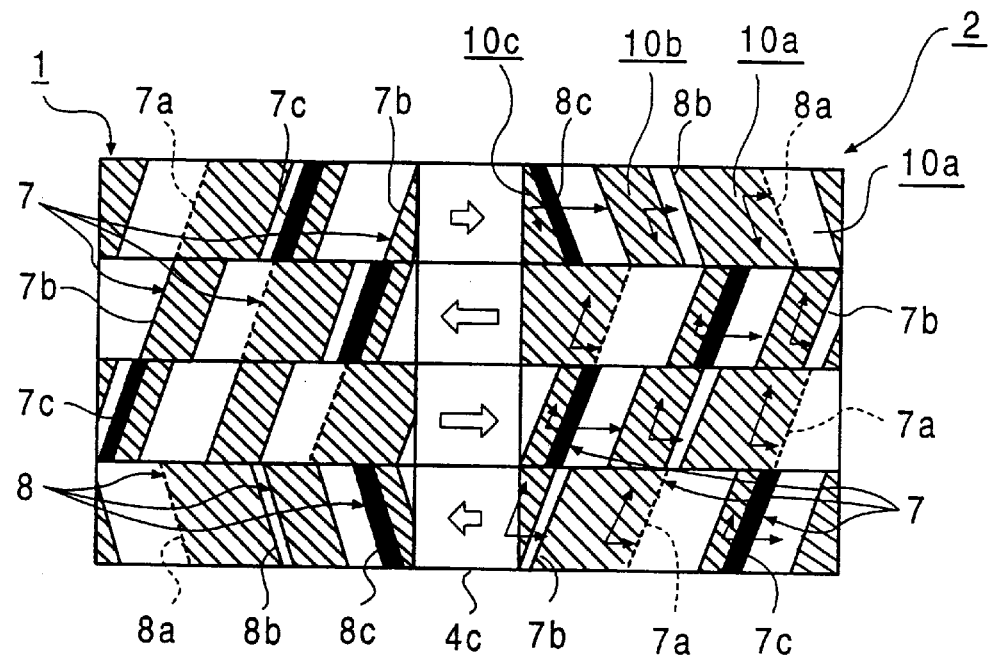
Figure 4B:
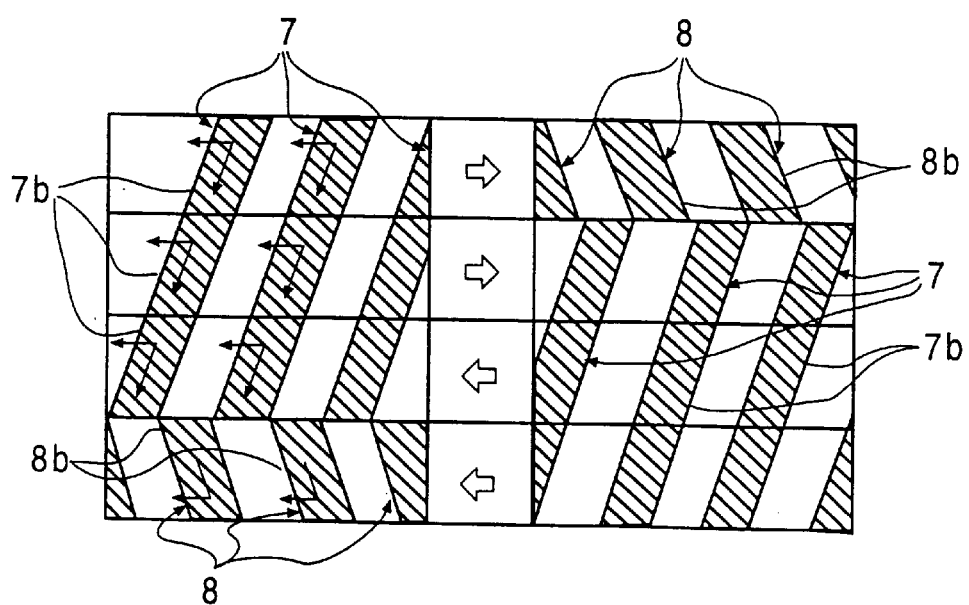

FIGS. 4A and 4B are illustrations showing the flow states of the kneading object in the enclosed kneading apparatus of the present invention and in the conventional enclosed kneading apparatus, respectively. In the drawings, the hatching portions show fill quantities of the kneading object, vectors show flow rates and directions of the kneading object, and open arrows show flow directions and flow rates of the kneading object in the communication section 4c.

Referring to FIG. 4A, since the small tip clearance is provided at the high tip portions 7a of the long wings 7 and the high tips 8a of the short wings 8 as described above, a small amount of the kneading object passes through the tip clearance. Therefore, the kneading object of the advance side of the high tip portions 7a and the high tips 8a flows in the axial direction in large amounts, whereby most of the kneading object moves to the advance side of the axially adjacent medium tip portions 7b of the long wings 7 and to the medium tips 8b of the short wings 8, and a part of the kneading object passes through the tip clearance. A large shearing force due to the small tip clearance is imparted to the part of the kneading object to disperse it. In addition to the dispersion, the temperature of the sheared kneading object suddenly increases. However, since most of the kneading object flows in the axial direction, the increase in the temperature of the overall kneading object is suppressed. Therefore, the kneading object can be continuously dispersed by a large shearing force even if the allowable temperature of the kneading object is low.

In addition, the high tip portions 7a of the long wings 7 and the high tips 8a of the short wings 8 move at the position in close proximity to the inner wall of the chamber 4, so that they scrape off the surface of the kneading object attached to the inner wall of the chamber 4. Therefore, the thickness of the kneading object attached to the inner wall of the chamber 4 becomes thin, and cooling efficiency by the cooling pipe through the chamber 4 is improved, so that the increase in the temperature of the kneading object can be further suppressed. Further, when the high tip portions 7a of the long wings 7 and the high tips 8a of the short wings 8 move in the communication section 4c, the kneading object is pressed from one of the first and second kneading chambers 4a and 4b to the other one of the first and second kneading chambers 4b and 4a by a large pressing force, so that flowing of the kneading object between the first and second kneading chambers is accelerated.

The large tip clearance is provided at the low tip portions 7c of the long wings 7 and the low tips 8c of the short wings 8, so that a large amount of the kneading object passes through the tip clearance. Therefore, the kneading object of the advance side of the low tip portions 7c and the low tips 8c flows in the circumferential direction in large amounts, whereby most of the kneading object moves to the advance side of the circumferentially adjacent medium tip portions 7b of the long wings 7 and the medium tips 8b of the short wings 8, and a part of the kneading object flows in the axial direction. In addition, the pressing force for pressing out the kneading object is small, so that flowing of the kneading object to the other first and second kneading chambers 4a and 4b when the low tip portions 7c and the low tips 8c move in the communication section 4c is suppressed. Therefore, flowing of the kneading object in the same pair of the kneading chambers 4a and 4b is accelerated and at the same time, and the large tip clearance reduces the shearing force to the kneading object, so that an excessive increase in the temperature of the kneading object is suppressed.

The medium tip portions 7b of the long wings 7 and the medium tips 8b of the short wings 8 are set to provide an intermediate tip clearance between the tip clearances of the high tip portions 7a and the low tip portions 7c, so that the shearing force and flowing of the kneading object are adjusted.

When the kneading object is kneaded as described above, first kneading spaces 10a for allowing the kneading object to flow in large amounts in the circumferential direction, second kneading spaces 10b for dispersing a small amount of the kneading object by a large shearing force while allowing a large amount of the kneading object to flow in the axial direction, and third kneading spaces 10c for allowing the kneading object to flow in the axial and circumferential directions by imparting an intermediate shearing force are provided continuously in the circumference and axial directions. Therefore, as compared with the conventional enclosed kneading apparatus shown in FIG. 4B in which long wings 7 and short wings 8 have medium tip portions 7b and medium tips 8b, respectively, the kneading object is uniformly dispersed in the first to third kneading spaces 10a to 10c while flowing actively. Thus, the kneaded product of a good kneading state can always be obtained without changing the tip clearance in response to kneading conditions of the kneading object, or without any sacrifice in the inherent handling capacity of the kneading apparatus, i.e. without changing the rotor speed, the input amount of materials and so forth.

As described above, the enclosed kneading apparatus of this embodiment obtains the kneaded product of a desired kneading state by flowing the kneading object in tip clearances between the inner wall of the chamber 4 and the first and second rotors 1 and 2 while rotating the first and second rotors 1 and 2 in the chamber 4, and by imparting a shearing force to disperse the kneading object, as shown in FIG. 1. The respective first and second rotors 1 and 2 are provided with wings having the long wings 7 and the short wings 8 which are equally spaced at three positions in the circumferential direction so as to provide a plurality of three different tip clearances in the axial and circumferential directions.

According to the described arrangements, in the smallest tip clearance of the three tip clearances provided by the long wings 7 and the short wings 8, most of the kneading object of the advance side of the tip clearance is flown in the axial direction, and a part of the kneading object is passed through the clearance and is subjected to dispersion by a large shearing force. On the other hand, in the large tip clearance, most of the kneading object of the advance side is passed therethrough to accelerate circumferential flow, and an increase in the temperature is prevented by a small shearing force. When large and small different tip clearances appear in the circumference and axial directions, the kneading object is dispersed by a large shearing force while actively flowing in the entire chamber 4, and an increase in the temperature of the kneading object during dispersion is prevented. Therefore, the kneading object of various kneading conditions can always be made into a kneaded product of a desired state without the maintenance of the rotor moving mechanism and the operation which sacrifices the handling capacity of the apparatus performed in the conventional kneading apparatus.

The number of rollers may be one, or three or more. In addition, in this embodiment, three different tip clearances are provided by the high to low tip portions 7a to 7c of the long wings 7 and the high to low tips 8a to 8c of the short wings 8 which are spaced equally at three positions in the circumferential direction. However, the provision of the short wings 8, the arrangement, the number and the helical angle of the long wings 7 and the short wings 8, and the axial length of the wing on which each of the tip clearances is provided may be arbitrarily selected so long as two or more steps of different tip clearances are provided at least in the axial direction.

Figure 5A:
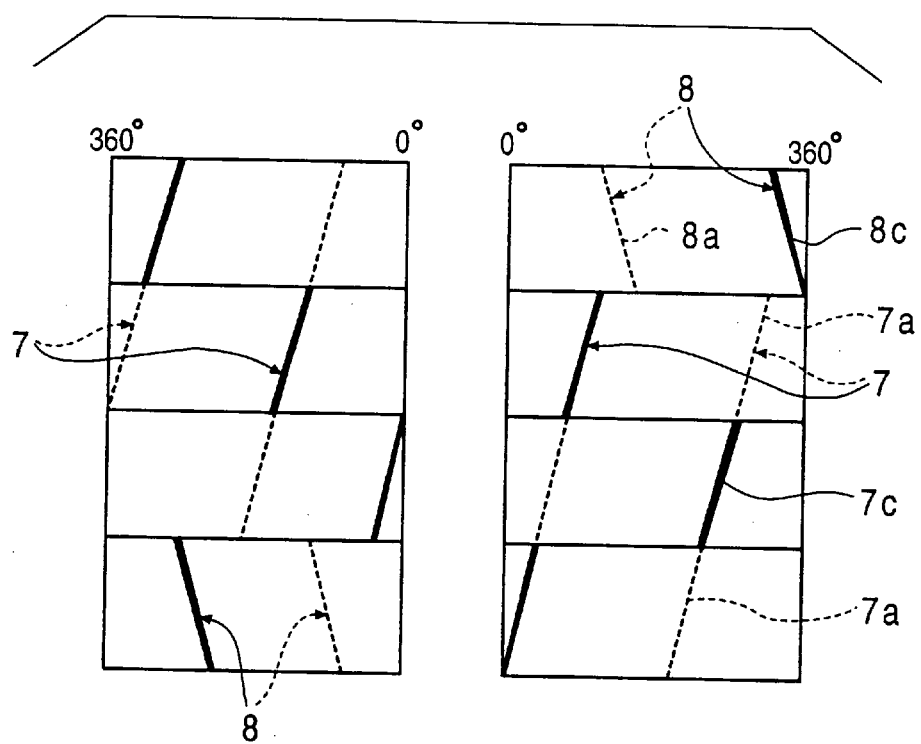
Figure 5B:
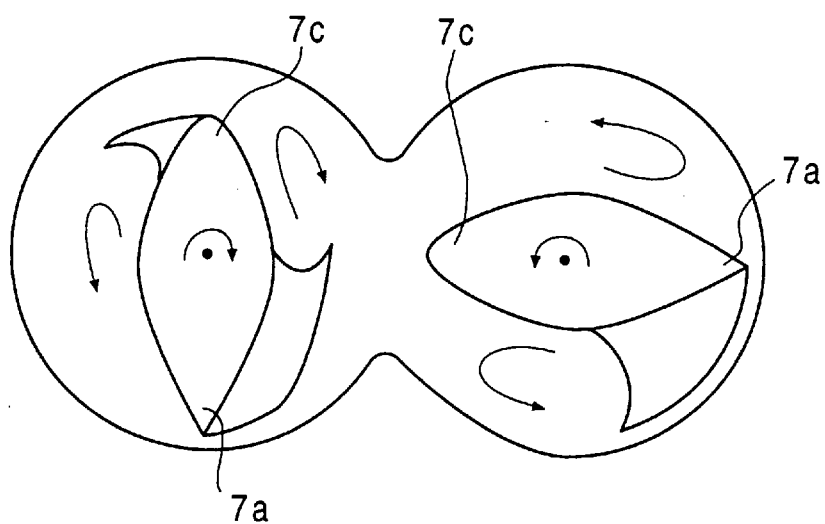
Figure 6:
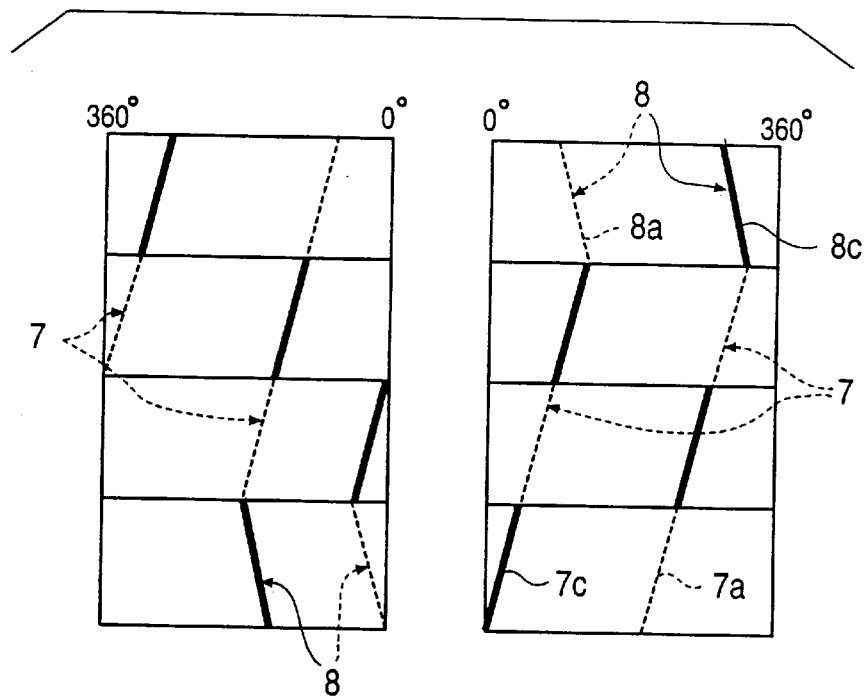
FIG. 6 is a development of the rotor.
Figure 7:
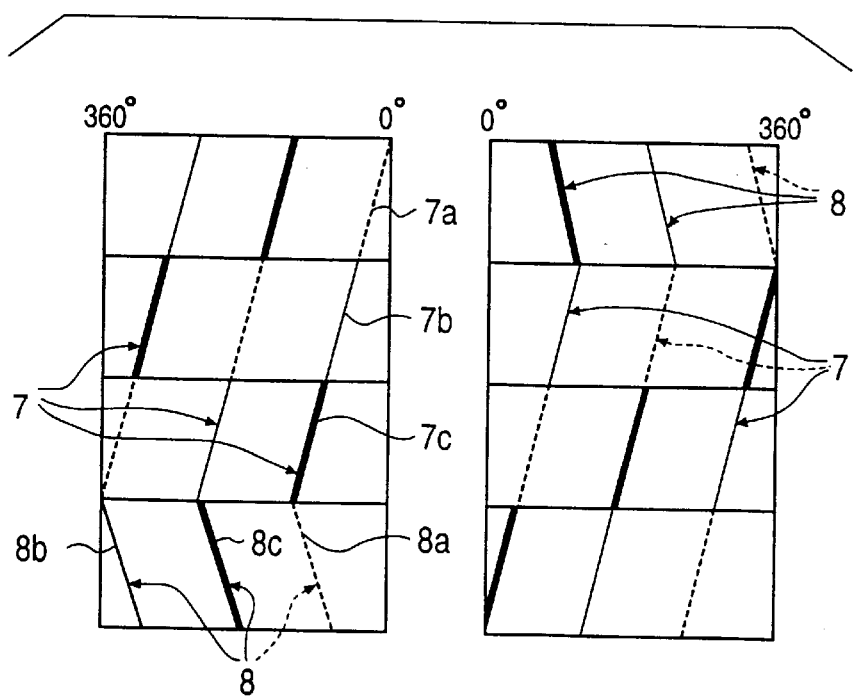
FIG. 7 is a development of the rotor.
Figure 8:
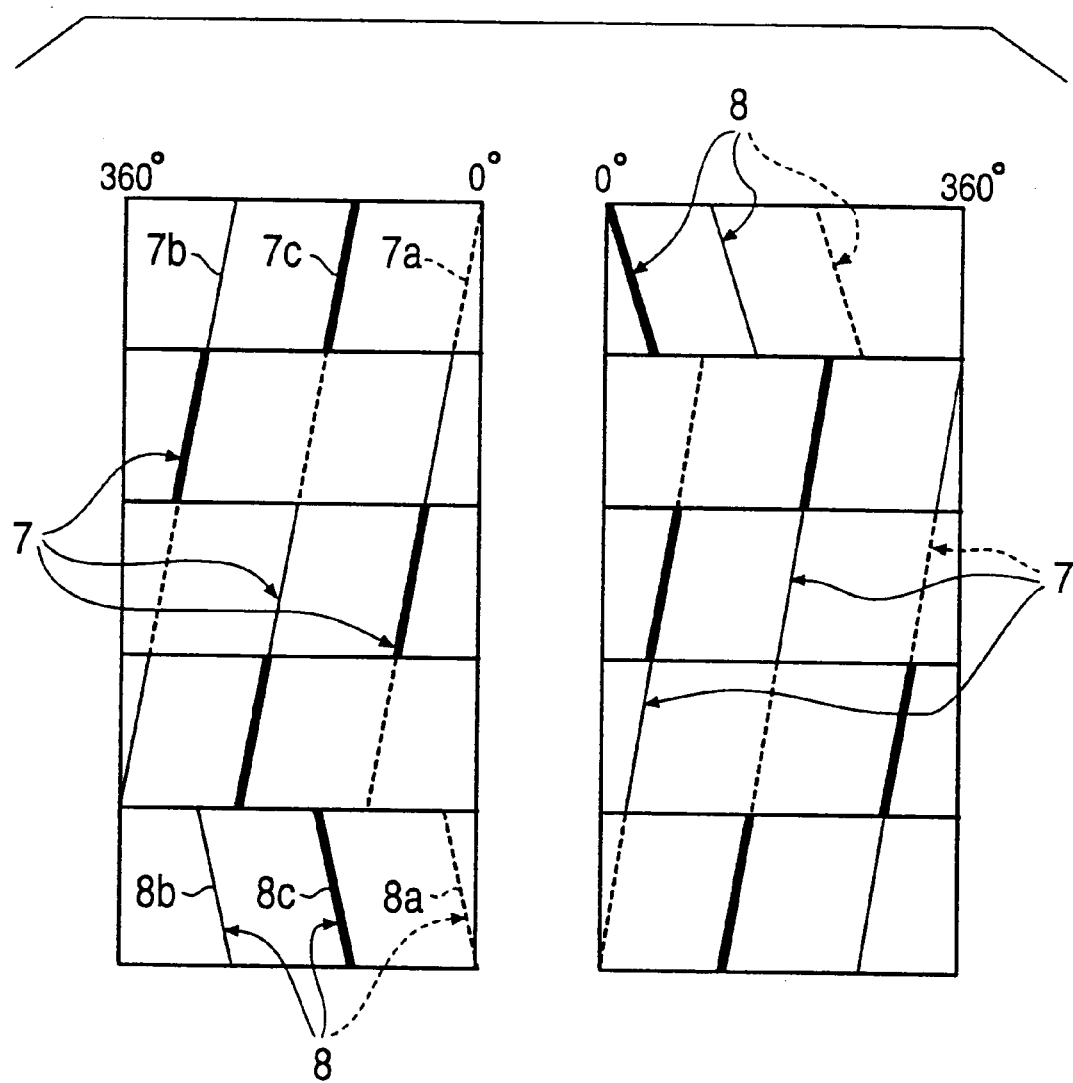
FIG. 8 is a development of the rotor.
Figure 9:
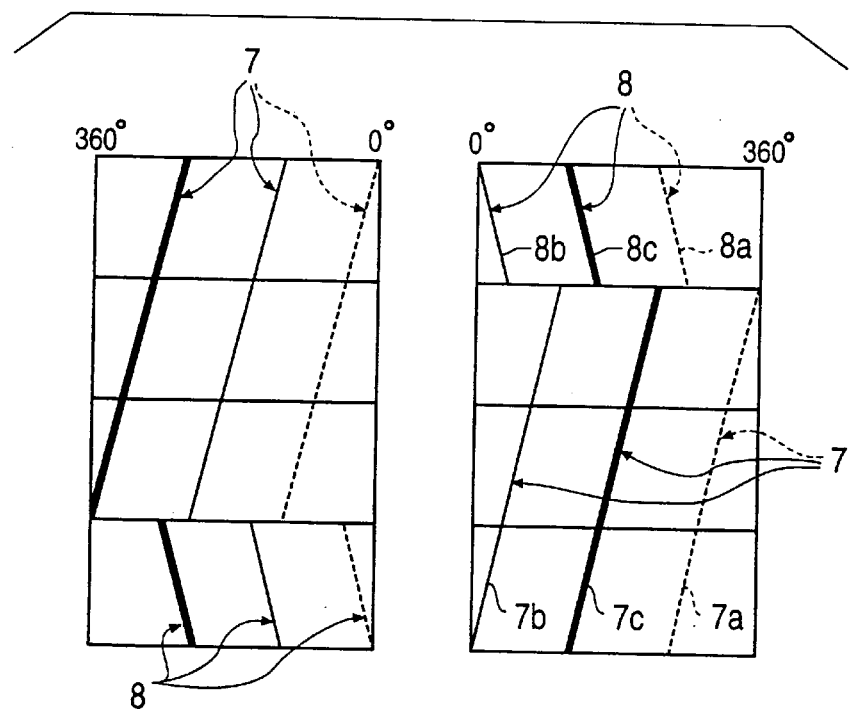
FIG. 9 is a development of the rotor.

More specifically, the rotors may be provided with only the long wings 7, or the long wings 7 and the short wings 8 may be equally spaced at two positions in the circumferential direction, as shown in FIGS. 5A and 5B. In addition, the ends of the long wings 7 may agree with those of the short wings 8, as shown in FIGS. 6 and 7, and the high tip portions 7a to the low tip portions 7c providing three-stage tip clearances may be formed on the long wings in four divided sections, as shown in FIG. 8. Further, as shown in FIG. 9, the long wing 7 having the high tip portion 7a alone, the long wing 7 having the medium tip portion 7b alone, and the long wing 7 having the low tip portion 7c alone may be spaced equally in the circumferential direction so that the tip clearances equal to each other in the axial direction are provided in three stages in the circumferential direction. The number of sections of the tip clearances at the long wings 7 and the short wings 8 may be preferably up to ten so that the wings may be easily manufactured.

Figure 10:
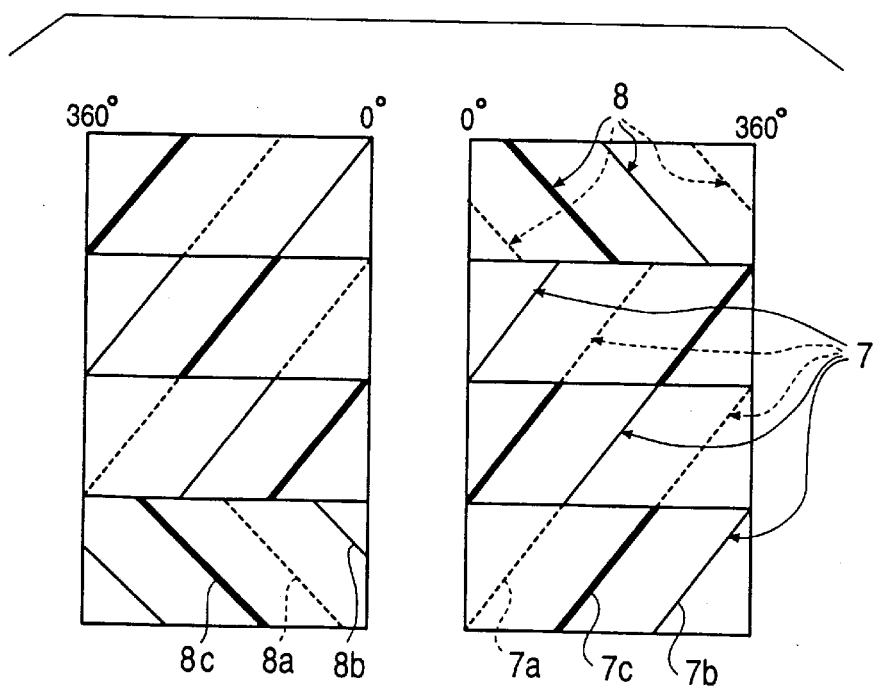
FIG. 10 is a development of the rotor.

Still further, as shown in FIG. 10, the long wings 7 and the short wings 8 may be formed with a large helical angle. The helical angle may be preferably set within the range of 10° to 60°. This is because the small helical angle decreases the axial flowing of the kneading object and the amount of the kneading object passing through the tip clearance increases, thereby accelerating the dispersing operation, while the large helical angle increases the axial flowing of the kneading object, thereby accelerating mixing in the chamber 4, and the helical angle within the range of 10° to 60° can bring out simultaneously the above two characteristics.

Figure 11:
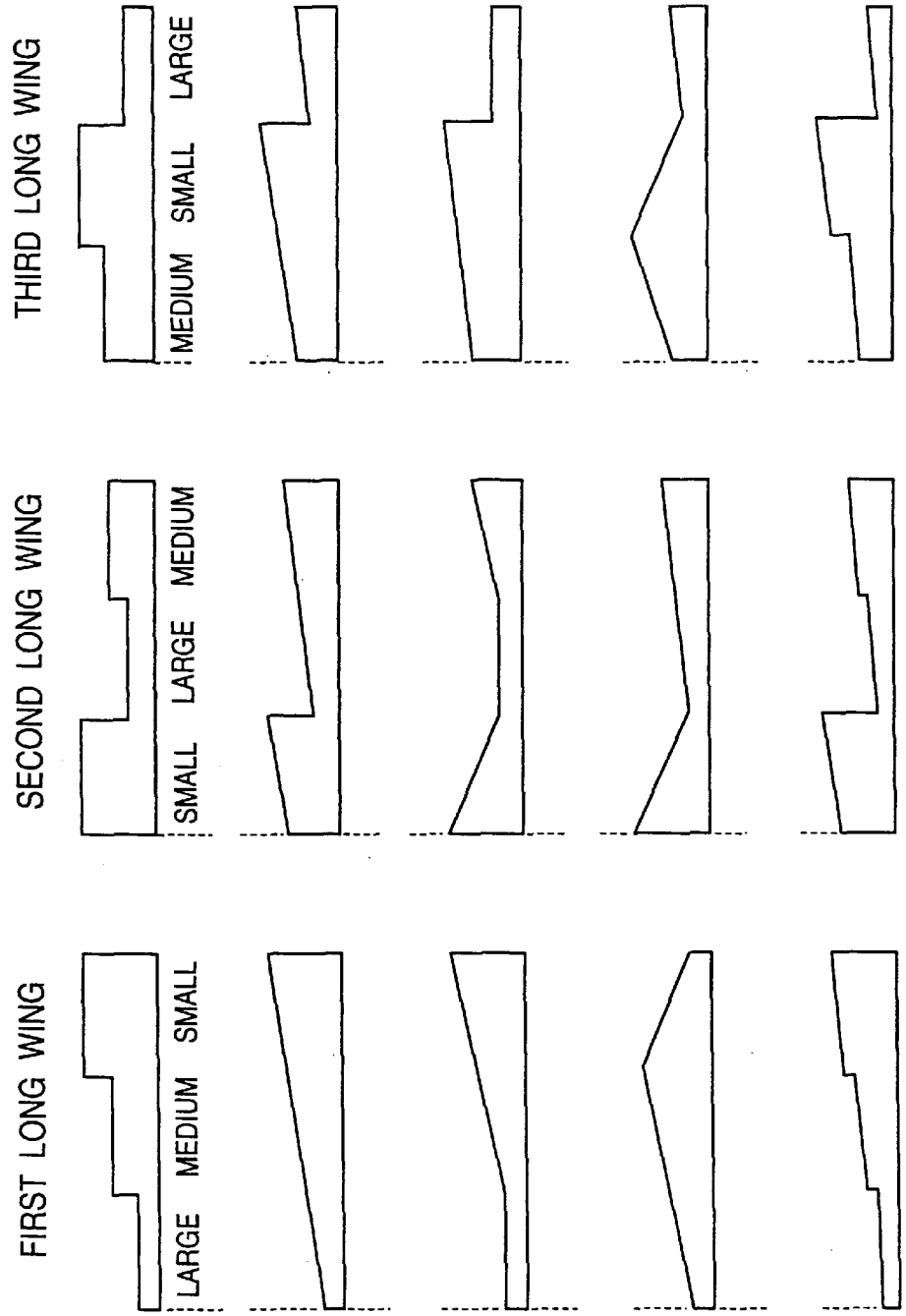
FIGS. 11A to 11E are views each showing the appearance of a plurality of tip clearances of one wing.

The plurality of tip clearances are not limited to one in which a large, a medium, and a small tip clearance are provided stepwise in straight lines. For example, when the long wings 7 are viewed from the direction perpendicular to the wing face in the development of the rotor of FIG. 2, the long wings 7 have three patterns of a first long wing, a second long wing, and a third long wing, as shown in FIG. 11A. The first wing provides a plurality of tip clearances with respect to one wing in the order of large, medium, and small tip clearances. The second wing provides a plurality of tip clearances with respect to one wing in the order of small, large, and medium tip clearances. The third wing provides a plurality of tip clearances in the order of medium, small, and large tip clearances.

Tapered tip clearances may also be formed, as shown in FIGS. 11B to 11E. The tip clearances of FIG. 11B are provided by the first long wing which is entirely linearly tapered. The second and third long wing provide combinations of the same tapers and stepped portions. In FIG. 11C, the large tip clearance remains straight, and the rest of medium and small tip clearances are tapered. In FIG. 11C, the medium or the small tip clearance may remain straight, and the rest of tip clearances may be tapered. In FIG. 11D, tapered tip clearances are combined so that bend points are provided rather than the stepped portions. In FIG. 11E, the large, medium, and small tip clearances are divided by slight steps and tapered portions. These tapered tip clearances may be adapted to all of the wings, a specific wing among all of the wings, or a part of the plurality of tip clearances of a specific wing. In addition, the tip clearances may be tapered in smooth curves.

The bend point and the corner of the stepped portions may preferably be chamfered, or provided with a radius from the viewpoint of preventing breakage and chipping.

Figure 15:
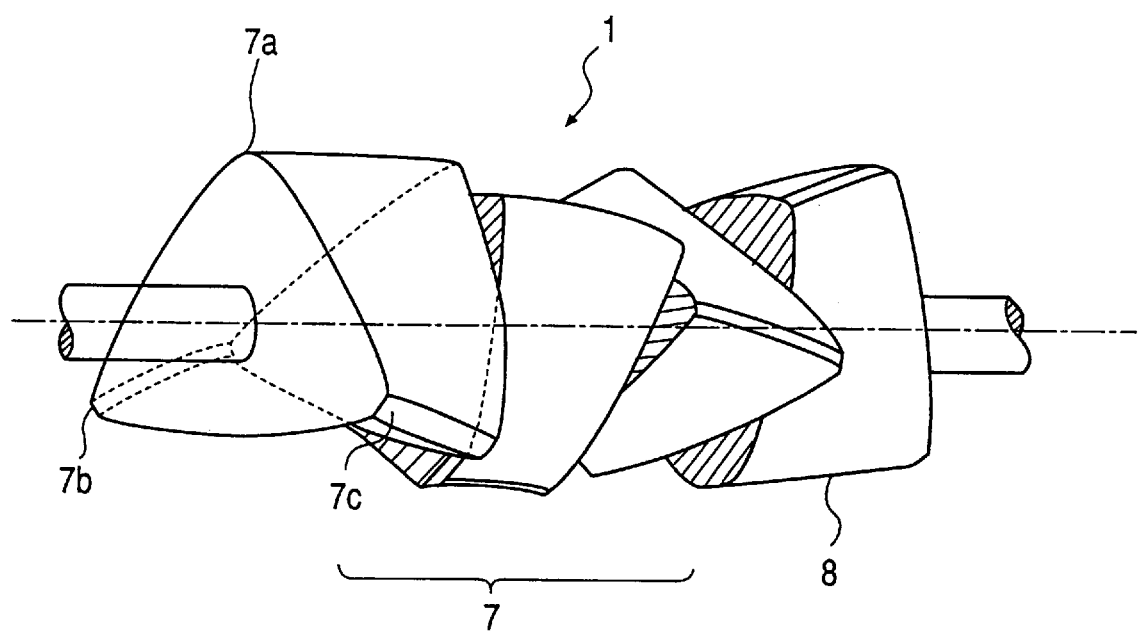
FIG. 15 is a perspective view of a rotor of a divided segment type.

The rotors can be manufactured by monobloc casting or skiving. However, a so-called divided-segment system can be adopted in which the overall wings or the long wings are divided into a plurality of segments. In this case, by shifting phases of the divided segments, as shown in FIG. 15, the flow of the kneading object is changed greatly, whereby the degree of kneading of the kneading object is further improved.

The widths of the respective divided segments may be formed equally or unequally, and the twist angle of the wing may be fixed or changed. They may be freely designed without departing from the technical idea of the present invention.

EXPERIMENTAL EXAMPLES

Figure 12:
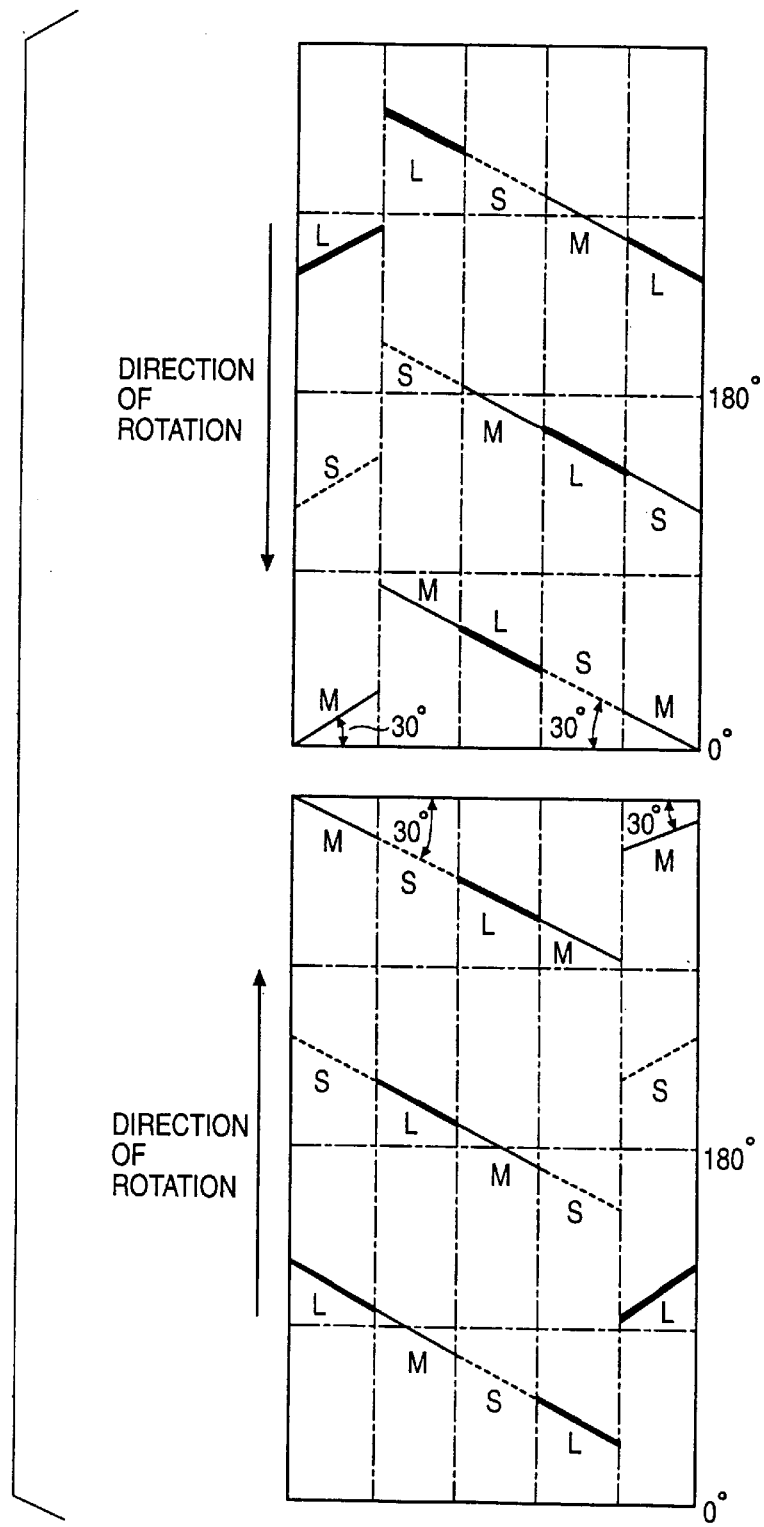
FIG. 12 is a development of the rotor used in experiments.

The results of a kneading test obtained by an experimental small enclosed kneading apparatus will now be described. A kneading chamber having a capacity of 4 liters was used. The arrangement of the wings of the rotors, and the arrangement of the large, medium, and small tip clearances used in the present invention are shown in the development of FIG. 12. The large tip clearance L was 6 mm (the ratio of the large clearance L to the inner diameter of 128.6 mm of the chamber was 0.0467), the medium tip clearance M was 3 mm (the ratio of the medium clearance M to the inner diameter of 128.6 mm of the chamber was 0.0233), and the small tip clearance S was 1 mm (the ratio of the small clearance S to the inner diameter of 128.6 mm of the chamber was 0.0078). The arrangement of the wings used in a comparative example was the same as that of the present invention, but all the tip clearances were 3 mm.

In both of the present invention and the comparative example, a compound containing 100 parts of natural rubber (CV60) and 50 parts of carbon black (SAF) was subjected to the kneading test. In addition, the rate of the compound charged in the kneading chamber was 70%, the ram pressure was 5 kgf/cm$^2$, and the temperature of cooling water flown into the case and rotors was 30° C. in both of the present invention and the comparative example.

Figure 13:
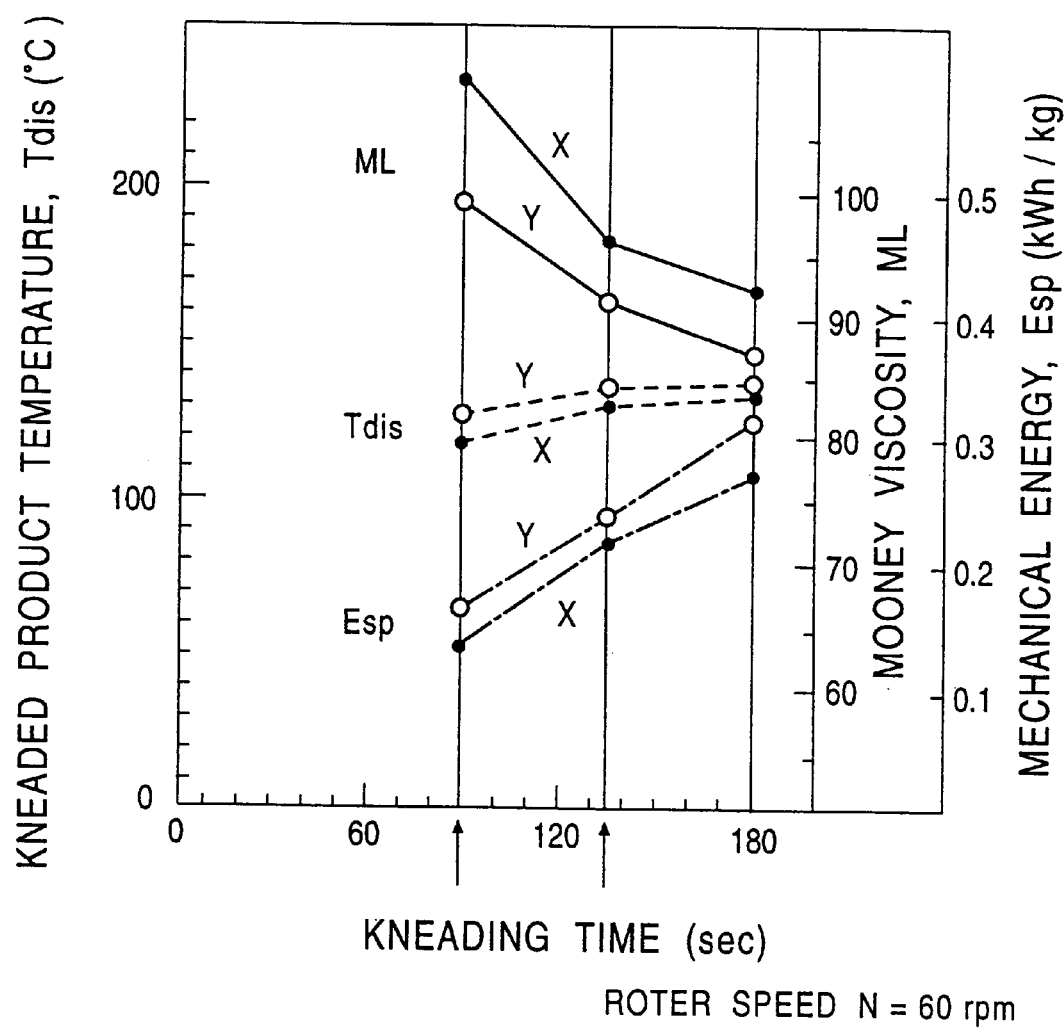
FIG. 13 is a graph showing properties of the rotors of the present invention and the comparative example when the rotor speed is 60 rpm.
Figure 14:
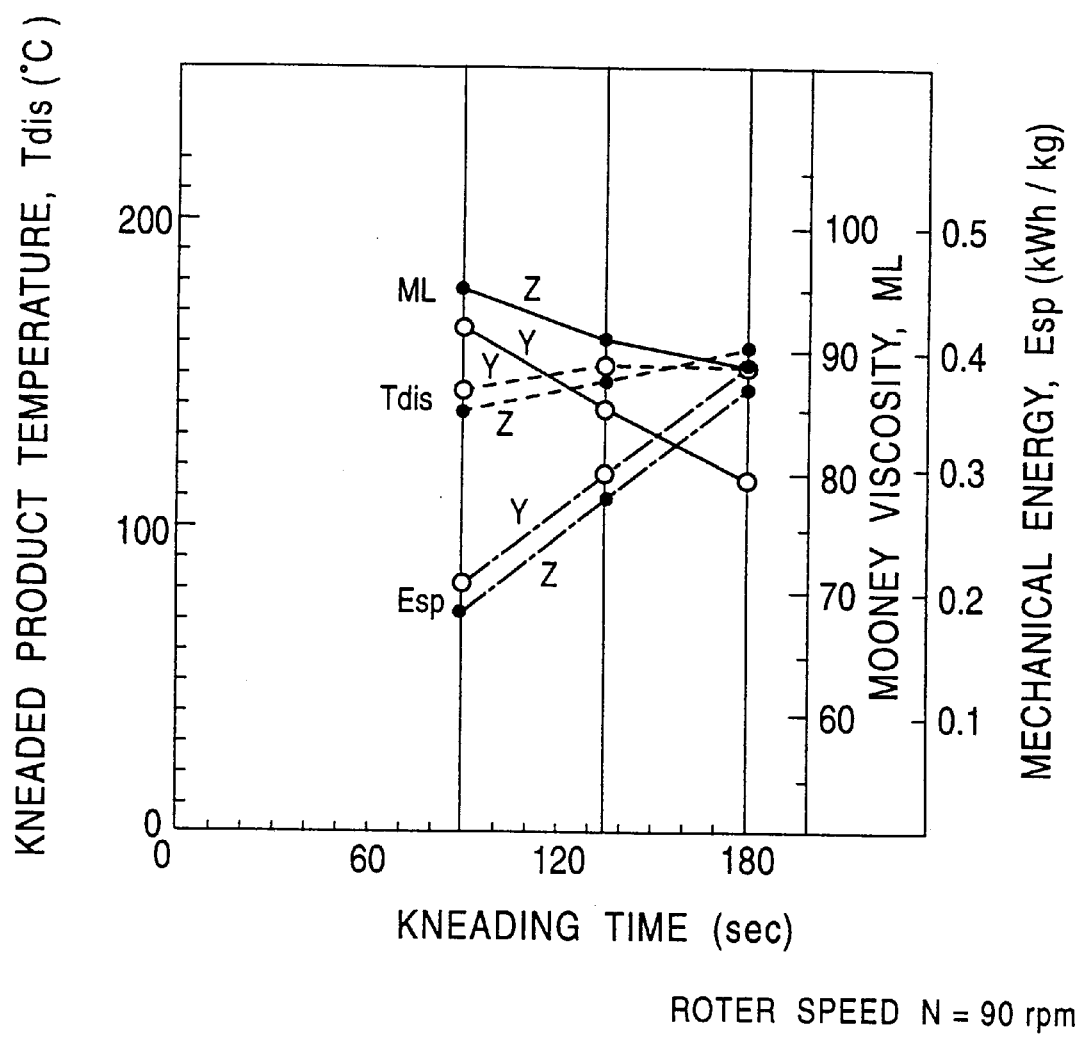
FIG. 14 is a graph showing properties of the rotors of the present invention and the comparative example when the rotor speed is 90 rpm.

The changes with time of the temperature Tdis (degrees C) of the kneaded product, the mechanical energy Esp (KWh/kg) imparted to the kneaded product, and Mooney viscosity of the kneaded product were measured. Their changes with time when the rotor speed is 60 rpm is shown in FIG. 13, and those when the rotor speed is 90 rpm is shown in FIG. 14. In these drawings, Y represents the rotors of the present invention, and X represents the rotors of the comparative example.

According to FIGS. 13 and 14, the following differences in properties between the rotors Y of the present invention and the rotors X of the comparative example exist.

1) The mechanical energy imparted to the kneaded product of the rotors Y of the present invention is larger than that of the rotors X of the comparative example.

2) The temperature of the kneaded product of the rotors Y of the present invention is slightly higher than that of the rotors X of the comparative example, but they are substantially equal.

3) The Mooney viscosity of the kneaded product of the rotors Y of the present invention is lower than that of the rotors X of the comparative example. In addition, as shown in FIG. 14, the rotors X of the comparative example decreases the Mooney viscosity to a lesser extent with the passage of time, while the rotors Y of the present invention decreases the Mooney viscosity substantially in proportion to the passage of time.

The above differences in properties 1) to 3) show that the rotors Y of the present invention have cooling capability higher than that of the rotors X of the comparative example, and can impart much mechanical energy to the kneaded product. In addition, it is shown that the higher the mechanical energy imparted, the more the viscosity of the kneaded product tends to decrease, and the rotors Y of the present invention can provide a kneaded product excellent in processability as compared with the rotors X of the comparative example.

In one form of the invention, there is provided an enclosed kneading apparatus for obtaining a kneaded product of a desired kneading state by flowing a kneading object in a tip clearance between the inner wall of a chamber and rotors while rotating the rotors in the chamber, and by imparting a shearing force to disperse the kneading object, wherein the rotors are provided with wings for providing a plurality of different tip clearances at least in the axial direction. In an another form of the invention, there is provided an enclosed kneading apparatus, wherein the wings consist of long wings and short wings, and a plurality of different tip clearances are provided at least along the long wings. In a still another form of the invention, there is provided an enclosed kneading apparatus, wherein at least two of the long wings and short wings are provided in the circumferential direction of said rotors, and a plurality of different tip clearances are provided at the at least two of the long wings and short wings.

These features of the invention offer the following advantages. The different tip clearances provided by the wings can be relatively divided into a small tip clearance and a large tip clearance. In the small tip clearance, most of the kneading object of the advance side of the tip clearance is flown in the axial direction, and a part of the kneading object is passed through the clearance and is subjected to dispersion by a large shearing force. On the other hand, in the large tip clearance, most of the kneading object of the advance side is passed therethrough to accelerate circumferential flow, and an increase in the temperature is prevented by a small shearing force. Thus, when large and small different tip clearances appear at least in the axial direction, the kneading object is dispersed by a large shearing force while actively flowing in the entire chamber, and an increase in the temperature of the kneading object during dispersion is prevented. Therefore, various kneading objects can always be made into kneaded products of desired states without the maintenance of the rotor moving mechanism and the operation which sacrifices the handling capacity of the apparatus performed in the conventional kneading apparatus.

In a further form of the invention, there is provided an enclosed kneading apparatus, wherein one of the plurality of tip clearances are provided by allowing the tops of the wings to be in close proximity to the inner wall of the chamber so as to scrape off the surface of the kneading object attached to the inner wall of the chamber and impart a strong shearing force to a part of the kneading object. This feature of the invention offers the following advantages. The wings in close proximity to the inner wall of the chamber periodically scrape off most of the kneading object attached to the inner wall of the chamber with the rotation of the rotors, so that the thickness of the kneading object attached becomes thin, whereby cooling efficiency for cooling the kneading object through the chamber is improved.

In a still further form of the invention, there is provided an enclosed kneading apparatus, wherein the plurality of tip clearances include at least two tip clearances of a small tip clearance, a medium tip clearance, and a large tip clearance, and the ratio of the tip clearance to the inner diameter of the chamber is within the range of 0.0025 to 0.0250 at the small tip clearance, within the range of 0.0100 to 0.0500 at the medium tip clearance, and within the range of 0.0250 to 0.1000 at the large tip clearance. This feature of the invention offers the following advantages. The ratio of the small tip clearance to the inner diameter of the chamber is within a predetermined range, and functions of fracturing a filler and an aggregate or a gel of additives contained in a kneaded product, and dispersing them into the kneaded product can be performed. In addition, the ratios of the medium tip clearance and the large tip clearance to the inner diameter of the chamber are within predetermined ranges, respectively, and a uniform shearing operation can be imparted to the kneaded product.

In an another form of the invention, there is provided an enclosed kneading apparatus, wherein the ratio of the tip clearance to the inner diameter of the chamber is within the range of 0.00625 to 0.0125 at the small tip clearance, within the range of 0.0125 to 0.0250 at the medium tip clearance, and within the range of 0.0250 to 0.075 at the large tip clearance. This feature of the invention offers the following advantage. Both of the dispersion of the aggregate or the gel into the kneaded product and the imparting of the uniform shearing operation to the kneaded product can be achieved in good balance.

In a further form of the invention, there is provided an enclosed kneading apparatus, wherein at least one tip clearance of the plurality of stepwise tip clearances is tapered. In a still further form of the invention, there is provided an enclosed kneading apparatus, wherein the wings include one wing having a plurality of tapered tip clearances formed thereon. These features of the invention offer the following advantages. The tapered tip clearances can change the flow of the kneaded product, and a easy-to-work shape of the rotor can be adopted.

In a still another aspect of the invention, there is provided an enclosed kneading apparatus, wherein the wings of the rotors are constituted by divided segments. This feature of the invention offers the following advantage. The wings can be easily worked, whereby a degree of freedom of design of the wings is increased.

What is claimed is:

1. An enclosed kneading apparatus comprising:

a chamber; and a rotor rotatable mounted in said chamber, said rotor being provided with a plurality of wings, each of said wings having a tip defining a tip clearance with respect to an inner wall of said chamber such that a material in said chamber may be sheared in said tip clearance when said rotor is rotated to knead the material, wherein said wings provide at least three different adjacent stepwise tip clearances, at least in the axial direction.

2. An enclosed kneading apparatus according to claim 1, wherein said wings consist of long wings and short wings, and said tip clearances are provided at least along said long wings.

3. An enclosed kneading apparatus according to claim 2, wherein at least two of said long wings and short wings are provided in the circumferential direction of said rotors, and said tip clearances are provided at said at least two of said long wings and short wings.

4. An enclosed kneading apparatus according to claim 1, wherein one of said tip clearances is provided by allowing the tops of said wings to be in close proximity to the inner wall of said chamber so as to scrape off the surface of the kneading object attached to the inner wall of said chamber and impart a strong shearing force to a part of the kneading object.

5. An enclosed kneading apparatus according to claim 1, wherein said tip clearances include tip clearances of a small tip clearance, a medium tip clearance, and a large tip clearance, and the ratio of the tip clearance to the inner diameter of said chamber is within the range of 0.0025 to 0.0250 at the small tip clearance, within the range of 0.0100 to 0.0500 at the medium tip clearance, and within the range of 0.0250 to 0.1000 at the large tip clearance.

6. An enclosed kneading apparatus according to claim 5, wherein the ratio of the tip clearance to the inner diameter of said chamber is within the range of 0.00625 to 0.0125 at the small tip clearance, within the range of 0.0125 to 0.0250 at the medium tip clearance, and within the range of 0.0250 to 0.075 at the large tip clearance.

7. An enclosed kneading apparatus according to claim 1, wherein at least one tip clearance of said stepwise tip clearances is tapered.

8. An enclosed kneading apparatus according to claim 1 or 4, wherein said wings include one wing having a plurality of tapered tip clearances formed thereon.

9. An enclosed kneading apparatus according to claim 1 or 4, wherein the wings of said rotors are constituted by divided segments.

* * * * *